(12) United States Patent
Bottome et al.

(10) Patent No.: US 8,540,487 B2
(45) Date of Patent: Sep. 24, 2013

(54) ACTUATABLE SEAL FOR AEROFOIL BLADE TIP

(75) Inventors: Kristofer J. Bottome, Nottingham (GB); Matthew P. Jevons, Derby (GB)

(73) Assignee: Rolls-Royce PLC, London (GB)

( * ) Notice: Subject to any disclaimer, the term of this patent is extended or adjusted under 35 U.S.C. 154(b) by 573 days.

(21) Appl. No.: 12/817,462

(22) Filed: Jun. 17, 2010

(65) Prior Publication Data
US 2011/0002776 A1 Jan. 6, 2011

(30) Foreign Application Priority Data
Jul. 1, 2009 (GB) .................................. 0911330.9

(51) Int. Cl.
*B63H 1/00* (2006.01)

(52) U.S. Cl.
USPC ............................ 416/174; 416/224; 416/228

(58) Field of Classification Search
USPC ..... 415/173.3, 173.1, 173.2, 174.2; 416/174, 416/224, 228; 277/583, 605, 646, 644, 645
See application file for complete search history.

(56) References Cited

U.S. PATENT DOCUMENTS

| | | | | |
|---|---|---|---|---|
| 5,511,795 A | * | 4/1996 | Laubach et al. | 277/543 |
| 5,752,802 A | * | 5/1998 | Jones | 415/170.1 |
| 6,139,268 A | * | 10/2000 | Murawski et al. | 416/23 |
| 6,206,642 B1 | | 3/2001 | Matheny et al. | |
| 7,549,841 B1 | | 6/2009 | Marussich | |
| 7,891,671 B2 | * | 2/2011 | Allford | 277/645 |
| 2005/0058539 A1 | | 3/2005 | Diakunchak | |
| 2008/0025841 A1 | | 1/2008 | Norton et al. | |
| 2008/0038116 A1 | | 2/2008 | Zemitis et al. | |
| 2008/0213098 A1 | | 9/2008 | Neef et al. | |

FOREIGN PATENT DOCUMENTS

| | | |
|---|---|---|
| EP | 1 746 256 A1 | 1/2007 |
| GB | 1 398 826 | 6/1975 |
| GB | 2 354 556 A | 3/2001 |
| GB | 2 374 123 A | 10/2002 |

OTHER PUBLICATIONS

British Search Report in British Application No. GB0911330.9 dated Oct. 21, 2009.

* cited by examiner

*Primary Examiner* — Edward Look
*Assistant Examiner* — Christopher J Hargitt
(74) *Attorney, Agent, or Firm* — Oliff & Berridge, PLC

(57) ABSTRACT

The present invention relates to an actuatable seal (14) for an aerofoil blade tip, for providing a seal between the blade tip (12) and an adjacent surface (10) over which the blade tip passes in use. The seal comprises a flexible member that is arranged in use to be mounted on the tip of a rotating aerofoil blade and to flex towards the surface under the action of centrifugal force when the blade rotates. The seal further comprises an actuator means provided on the flexible member and operably arranged in use to deflect at least a portion of the flexible member away from the surface.

8 Claims, 5 Drawing Sheets

ACTUATABLE SEAL FOR AEROFOIL BLADE TIP

The present invention relates to an actuatable seal for an aerofoil blade tip, such as the tip of a rotating fan blade.

In a ducted fan, such as is commonly used in an aero engine, for example, the fan is disposed co-axially within a duct and is driven to rotate within the duct to direct air rearwardly through the duct. The fan has a plurality of circumferentially spaced fan blades.

For efficiency and stability of the fan blades, the gaps between the tips of the blades and the inner casing of the duct within which the fan rotates—known as the fan case—must be kept to a minimum so as to minimise leakage of air around the tips of the blades.

However, with smaller clearances between the blade tips and the fan case comes the likelihood that some rubbing between the two will take place in certain operating conditions. For example, when the speed of rotation of the fan increases the blades can elongate due to centrifugal forces. Also, for an aero engine, during certain manoeuvres of the aircraft gyroscopic forces may temporarily cause the fan and duct to come out of perfect axial alignment which can lead to rubbing between the blade tips and the fan case.

To accommodate this rubbing, the fan case is provided with a lining comprising a sacrificial abradable layer which is designed to be cut or rubbed away by the blade tips. The liner is sometimes referred to as a Fan Track Liner (FTL).

The fan track liners are positioned outboard of the fan blades. They comprise an abradable liner which is supported by an aluminium honeycomb structure. The abradable liner consists of Nomex® honeycomb which is filled with lightweight epoxy filler. This liner forms an aerodynamic seal between the fan blades and the fan case to prevent leakage of air over the tip of the fan blade. This leakage would affect performance and stability of the fan blade. Under certain operating conditions, such as those outlined above, it is acceptable for the fan blade to make contact with the abradable liner.

Of course, to ensure no damage and maximise longevity, the tip of the fan blade could be designed to have a clearance gap sufficient to ensure that even under heavy manoeuvre loading there would be no contact between the blade and the liner. If this were the case then there would be no requirement for an attrition coating—i.e. an abradable liner—which would help simplify and reduce the expense of the fan case. However, an increased clearance gives a specific fuel consumption (SFC) penalty due to aerodynamic losses at the tip of the fan blade.

If it is accepted that tip rubbing will occur, and the clearances are chosen accordingly, then the tip will seal well at maximum speed, but less so at cruise speed due to there being less blade growth under centrifugal forces. This results in an efficiency drop at cruise speed. For every rub that does occur, for example due to manoeuvre loading or abnormal engine conditions (e.g. red line—over speed) the efficiency drop at cruise subsequently increases due to an increase in the size of the gap.

Furthermore, in the interests of weight saving, aero engine manufacturers are increasingly looking to use composite materials for manufacturing primary components such as fan blades. A composite fan blade typically comprises layers of fabric containing fibres which have high tensile strength, such as carbon fibres, embedded in an epoxy resin matrix. The tip of a blade made of such composite material would not abrade the sacrificial abradable layer in the fan case. Instead the blade tip itself would become worn down by the rubbing. In any case the epoxy resin would melt at the high temperatures generated by the abrasion which could potentially lead to disintegration of the blade. Because of this, in the prior art large tip gaps have been used, with consequential penalties as outlined above.

In view of the above, embodiments of the present invention aim to provide a tip seal for a blade, such as a rotating fan blade.

The present invention is defined in the attached independent claims, to which reference should now be made. Further, preferred features may be found in the sub-claims appended thereto.

According to the invention there is provided an actuatable seal for an aerofoil blade tip, for providing a seal between the blade tip and an adjacent surface over which the blade tip passes in use, the seal comprising: a flexible member arranged in use to be mounted on the tip of a rotating aerofoil blade and to flex towards the surface under the action of centrifugal force when the blade rotates, and actuator means provided on the flexible member and operably arranged in use to deflect at least a portion of the flexible member away from the surface.

The actuator means is preferably a piezoelectric actuator.

The flexible member may comprise a membrane attached to a tip of an aerofoil blade along an edge of the membrane.

The flexible member may comprise a fold or loop of flexible material attached to a tip of an aerofoil blade along at least two edges of the flexible material.

The flexible member may define an elongate cavity over the tip of the blade.

In a preferred arrangement the flexible member has a plurality of holes through which air, under pressure, is arranged to pass to assist in sealing the gap between the flexible member and the surface.

The invention also includes an aerofoil blade having actuatable seal according to any statement herein.

Preferred embodiments of the present invention will now be described by way of example only with reference to the accompanying diagrammatic drawings, in which.

The embodiments described below concern an actuatable tip seal suitable for mounting to the tip of a blade rotating within a duct casing, such as a fan blade rotating within a fan case of an aero engine. The actuatable tip seal aims to form and maintain a seal between the tip of the rotating blade and the duct wall so as to minimise the gap between the two and hence minimise the leakage of fluid such as air around the tips of the blades.

Advantageously, the seal may be a sacrificial component that, in the case of substantial tip rub, can become detached from the blade without significantly damaging the blade. The blade may be of conventional design and construction so that the tip seal can be provided with minimum modification to the blade.

The blade can be manufactured from lightweight structural materials. For example it can be manufactured from thermoplastic PEEK or PPS materials, or metals such as stainless steel or titanium alloy. The root of the blade is of conventional design and construction.

Figure 1:
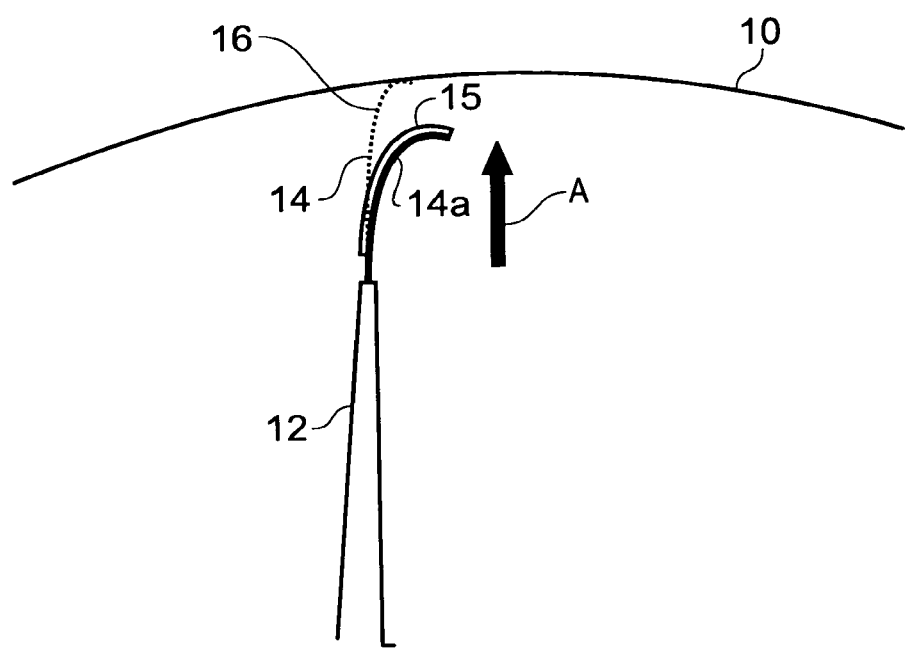
FIG. 1 shows schematically a first embodiment of actuatable blade tip seal according to the present invention.

Turning to FIG. 1, this illustrates a first embodiment of tip seal according to the invention. A fan case is shown at 10 and a fan blade which rotates within the fan case is represented at 12.

A flexible, actuatable tip seal 14 has a flexible member, in the form of a membrane, which is attached along the tip edge of the blade in a chordwise direction. Due to centrifugal forces acting in the direction of arrow A when the blade rotates, the flexible membrane is urged to flex outwardly towards the fan case 10. If it were left to do so at sufficiently high speeds of rotation, it would adopt the position shown at 16 in dotted lines and would actually rub against the fan case 10.

The flexible tip seal 14 comprises a membrane which can be formed, for example, from a rubberised material, a thermoplastic, metal or thermoset composite. Depending upon the material of the seal 14 and blade 12 it may be possible to manufacture both together as an integral component or section. For example the two parts maybe co-moulded in a compression moulding or an injection moulding, or if the blade is metallic the membrane may be welded on as a thin metallic foil. If the blade 12 and seal 14 are of different materials it may be necessary to secure the seal onto the blade for example by bolting, welding or bonding or fixing by rivets or keyways. An advantage of having a separate seal 14, rather than an integrally formed seal, is that a separate seal can be more easily removed and replaced as necessary.

On a leading edge 14*a* of the seal 14 a number of piezoelectric sheets (not shown) are bonded. The bonding agent can be a thermoset, such as an epoxy with a maximum cure temperature of 150° C. or less. As alternatives, room-temperature or UV-curing systems could also be used. If the membrane is of a composite material the piezoelectric material can be laid up within the outer layer of membrane material in a sandwich structure.

The engine is set to have a cold build clearance. Upon running, the natural motion of the tip is to move outwards under centrifugal loading. The membrane should be arranged such that it is stiff enough to resist the air as the air passes around the tip of the blade. To counteract the radially outward movement of the membrane which would otherwise lead to rubbing in certain circumstances, a current is supplied to the piezoelectric material which is arranged either to limit the elongation of the membrane or, if the membrane is curved, is arranged to lengthen the piezoelectric material and thereby deflect the tip away from the fan case.

Electricity can be supplied to the fan either directly through a slip ring or indirectly through induction. It is also possible that energy could be obtained locally, for example utilising the vibration of motion of the blade.

The clearance can be controlled and designed such that at cruise speeds the system is in an optimum position without requiring actuation of the piezo sheet requiring activation only at higher rotational speeds, e.g. at take off.

Preferred piezoelectric materials include ceramic lead zirconium titanate (PZT) or polymeric PVDF (polyvinyldene fluoride).

Although the above described embodiment has the benefit of simplicity there is a risk of the membrane flapping in the airflow which passes over the tip of the blade, which could result in it becoming damaged.

Figure 2:
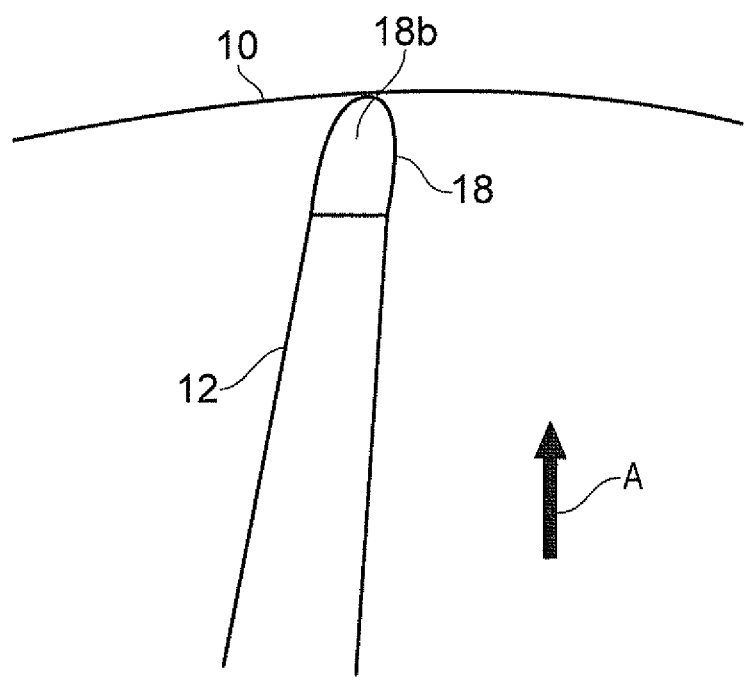
FIG. 2 shows schematically a second embodiment of actuatable blade tip seal according to the present invention, in a first configuration.

FIG. 2 shows an alternative, more complex embodiment in which the tip seal utilises a loop of flexible material in a fold or bridge shape. In this embodiment, the centre of the seal naturally moves outwards under centrifugal loading as in the first embodiment, but is limited in this movement by being fixed to the tip of the blade at both edges.

The blade 12 and casing 10 are numbered as before with reference to FIG. 1, as is arrow A. In this embodiment a tip seal 18 is a bridge or open flexible seal which can again be a flexible elastomeric element. The tip seal may be reinforced with a composite or metallic strip if required to give more stiffness to the seal. The seal can be flexible and formed of thermoplastic which can be injection moulded or drawn into shape. A cavity 18*b* is formed within the tip seal 18. Piezoelectric sheets (not shown) are again bonded on the tip seal.

At higher rotational speeds the piezoelectric material is arranged to cause an inflection in the seal, which causes the center of the seal to invert inwardly towards the cavity 18*b*. The effect of this is to move the center away from the case. It also allows the seal to have two areas of contact, or near contact, with a cavity in between.

If the tip seal were not inflected using the piezoelectric actuator it would move outwards under the influence of centrifugal forces and if there was no restraint it would sit further out than the fan case 10. The result of this would be to cause the flexible seal to wear quickly against the surface of the fan case which would require the seal to be replaced frequently in order to retain the efficiency of the system and not adversely affect SFC.

Figure 3:
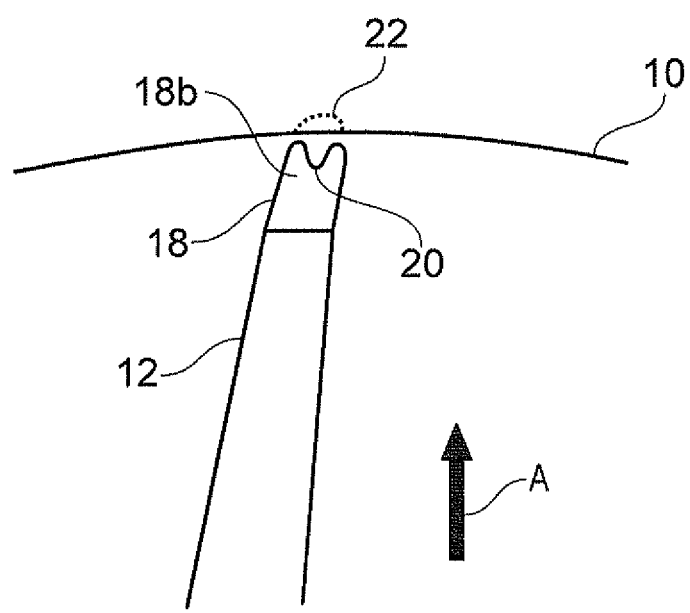
FIG. 3 shows the blade tip seal of FIG. 2 in a second configuration.

FIG. 3 shows at 20 the tip seal 18 inflected back into the cavity 18*b* under the influence of piezoelectric actuation. The dotted lines 22 show the virtual position of the tip seal 18 which would be adopted at high rotational speeds if no piezoelectric actuation were to be applied.

Figure 4:
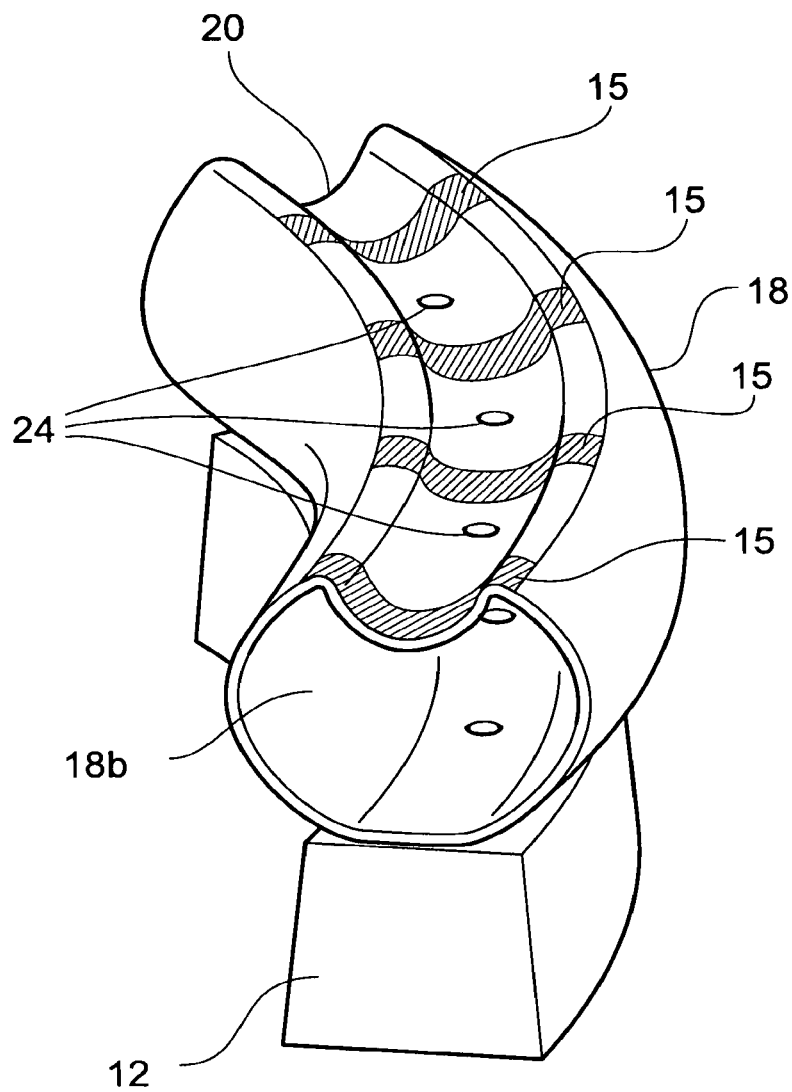
FIG. 4 shows in part sectional view a third embodiment of blade tip seal.
Figure 5:
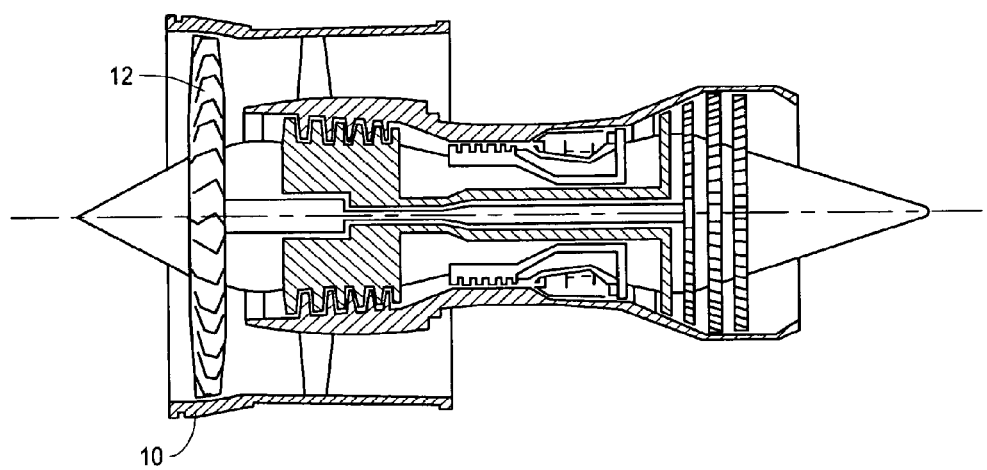
FIG. 5 shows an aero engine.

Turning to FIG. 4, this shows a third embodiment of the present invention. The third embodiment is a development of the second embodiment described above with reference to FIGS. 2 and 3. In this embodiment the cavity 18*b* is pressurised with air passing through the tip of the blade into the main cavity of the seal 18. Small holes 24 in the seal allow air into the recess above the seal. This allows the seal to run on an effective air cushion which reduces the likelihood of contact with the fan case and hence reduces friction, thereby keeping wear to a minimum.

In these embodiments it is desirable for the tips to be manufactured separately from the body of the blade and attached to it later. This enables the tips to be easily replaced in the case of damage. It is preferable that the tips are mounted via a mechanical link, such as for example a dovetail or fir-tree root, that also engages electrical connections to supply electricity to electrodes on the piezoelectric material. Further securing means such as adhesive may also be used.

Large fan blades typically have an external layer of titanium or other metallic material and this may be useful as an attachment point for the tip.

Whilst the above described embodiments consider a tip seal attached to a rotating fan blade, it will be understood by those skilled in the art that this invention can be used on other rotating blades within the temperature limits of the piezo materials used, without departing from the scope of the invention as defined by the claims.

The invention claimed is:

1. An actuatable seal for an aerofoil blade tip, for providing a seal between the blade tip and an adjacent surface over which the blade tip passes in use,
    the seal comprising:
        a flexible member arranged in use to be mounted on the tip of a rotating aerofoil blade and to flex towards the surface under the action of centrifugal force when the blade rotates, and actuator means provided on the flexible member and operably arranged in use to deflect at least a portion of the flexible member away from the surface.

2. An actuatable seal according to claim 1, wherein the actuator means is a piezoelectric actuator.

3. An actuatable seal according to claim 1, wherein the flexible member comprises a membrane attached to a tip of an aerofoil blade along an edge of the membrane.

4. An actuatable seal according to claim 1, wherein the flexible member comprises a fold or loop of flexible material attached to a tip of an aerofoil blade along at least two edges of the flexible material.

5. An actuatable seal according to claim 4 wherein the flexible member defines an elongate cavity over the tip of the blade.

6. An actuatable seal according to claim 5 wherein the flexible member has a plurality of holes through which air, under pressure, is arranged to pass to assist in sealing the gap between the flexible member and the surface.

7. An aerofoil blade having an actuatable seal according to claim 1.

8. An aero engine including an aerofoil blade according to claim 7.

* * * * *